(12) United States Patent
Abali et al.

(10) Patent No.: US 11,221,770 B2
(45) Date of Patent: Jan. 11, 2022

(54) PROVIDING A DYNAMIC RANDOM-ACCESS MEMORY CACHE AS SECOND TYPE MEMORY

(71) Applicant: INTERNATIONAL BUSINESS MACHINES CORPORATION, Armonk, NY (US)

(72) Inventors: Bulent Abali, Tenafly, NJ (US); Alper Buyuktosunoglu, White Plains, NY (US); Balaram Sinharoy, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 16/702,080

(22) Filed: Dec. 3, 2019

(65) Prior Publication Data

US 2021/0165580 A1    Jun. 3, 2021

(51) Int. Cl.
*G06F 3/06* (2006.01)
*G06F 12/0891* (2016.01)

(52) U.S. Cl.
CPC .......... *G06F 3/0619* (2013.01); *G06F 3/0652* (2013.01); *G06F 3/0656* (2013.01); *G06F 3/0673* (2013.01); *G06F 12/0891* (2013.01); *G06F 2212/1032* (2013.01)

(58) Field of Classification Search
CPC ......... G06F 12/0891; G06F 2212/1032; G06F 3/0619; G06F 3/0652; G06F 3/0656; G06F 3/0673; G06F 12/0893; G06F 12/0895; G06F 12/0897
See application file for complete search history.

(56) References Cited

U.S. PATENT DOCUMENTS

| | | | |
|---|---|---|---|
| 6,564,305 B1 | 5/2003 | Moore | |
| 9,483,415 B2 | 11/2016 | Tung et al. | |
| 9,830,262 B2 | 11/2017 | Duluk et al. | |
| 9,864,541 B2 | 1/2018 | Malyugin et al. | |
| 2017/0206172 A1 | 7/2017 | Ma et al. | |
| 2017/0235524 A1* | 8/2017 | Yoo | G06F 12/0868 711/103 |

(Continued)

FOREIGN PATENT DOCUMENTS

| | | |
|---|---|---|
| KR | 100381615 B1 | 4/2003 |
| WO | 2019074743 A1 | 4/2019 |

OTHER PUBLICATIONS

"Bankshot: Caching Slow Storage in Fast Non-Volatile Memory". Bhaskaran et al., INFLOW '13 Proceedings of the 1st Workshop on Interactions of NVM/FLASH with Operating Systems and Workloads, Article No. 1. DOI:10.1145/2527792.2527793, (9 Pages).

(Continued)

*Primary Examiner* — Zhuo H Li
(74) *Attorney, Agent, or Firm* — Griffiths & Seaton PLLC

(57) ABSTRACT

Various embodiments are provided for providing a dynamic random-access memory ("DRAM") cache as second type memory in a computing system by a processor. A selected amount of bytes in a memory line may be cleared using one or more spare bits of the DRAM, a data compression operation, or a combination thereof. A cache directory and data may be stored in the memory line. The DRAM cache is configured as a cache of a second type memory.

17 Claims, 11 Drawing Sheets

(56) References Cited

U.S. PATENT DOCUMENTS

2017/0371793 A1* 12/2017 Saidi .................. G06F 12/0871
2018/0165202 A1   6/2018 Balakrishnan et al.

OTHER PUBLICATIONS

"Super-Scalar RAM-CPU Cache Compression". Zukowski et al.,22nd International Conference on Data Engineering (ICDE'06), DOI: 10.1109/ICDE.2006.150, (12 Pages).

* cited by examiner

FIRST ORDER PERFORMANCE ESTIMATION

| | LATENCY RELATIVE TO DRAM | AVERAGE CPI | AVERAGE CPI CALCULATION |
|---|---|---|---|
| BASE (DRAM ONLY) | 1.0 | 1.0 | 0.8 + 0.2*1 = 1 |
| Slow DRAM ONLY | 2.0 | 1.20 | 0.8 + 0.2*2 = 1.2 |
| DRAM CACHE + Slow DRAM (90% HIT RATE ON DRAM CACHE) | 1.2 | 1.04 | 0.8 + 0.2*1.2 = 1.04 |
| SCM only | 20.0 | 4.80 | 0.8 + 0.2*20 = 4.8 |
| DRAM CACHE + SCM (90% HIT RATE ON DRAM CACHE) | 3.0 | 1.40 | 0.8 + 0.2*3.0 = 1.4 |

NOTE: MEMORY CPI IS 20% OF THE CPI STACK IN THIS APPLICATION (10-30% TYPICAL)

FIG. 7

PROVIDING A DYNAMIC RANDOM-ACCESS MEMORY CACHE AS SECOND TYPE MEMORY

BACKGROUND OF THE INVENTION

Field of the Invention

The present invention relates in general to computing systems, and more particularly to, various embodiments for providing a dynamic random-access memory ("DRAM") as a cache of a second type memory using one or more computing processors.

Description of the Related Art

In today's society, computer systems are commonplace. Computer systems may be found in the workplace, at home, or at school. Computer systems may include data storage systems, or disk storage systems, to process and store data. In recent years, both software and hardware technologies have experienced amazing advancement. With the new technology, more and more functions are added and greater convenience is provided for use with these computer systems. The amount of information to be processed nowadays increases greatly. Therefore, processing, storing, and/or retrieving various amounts of information is a key problem to solve.

SUMMARY OF THE INVENTION

Various embodiments are illustrated for provided for providing a dynamic random-access memory ("DRAM") cache as second type memory in a computing system by a processor. A selected amount of bytes of memory in a memory line may be cleared using one or more spare bits of the DRAM, a data compression operation, or a combination thereof. A cache directory and data may be stored in the memory line. The DRAM cache is configured as a cache of a second type memory.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is an additional block diagram depicting a first order performance estimation in accordance with aspects of the present invention.

DETAILED DESCRIPTION OF THE DRAWINGS

Figure 1:
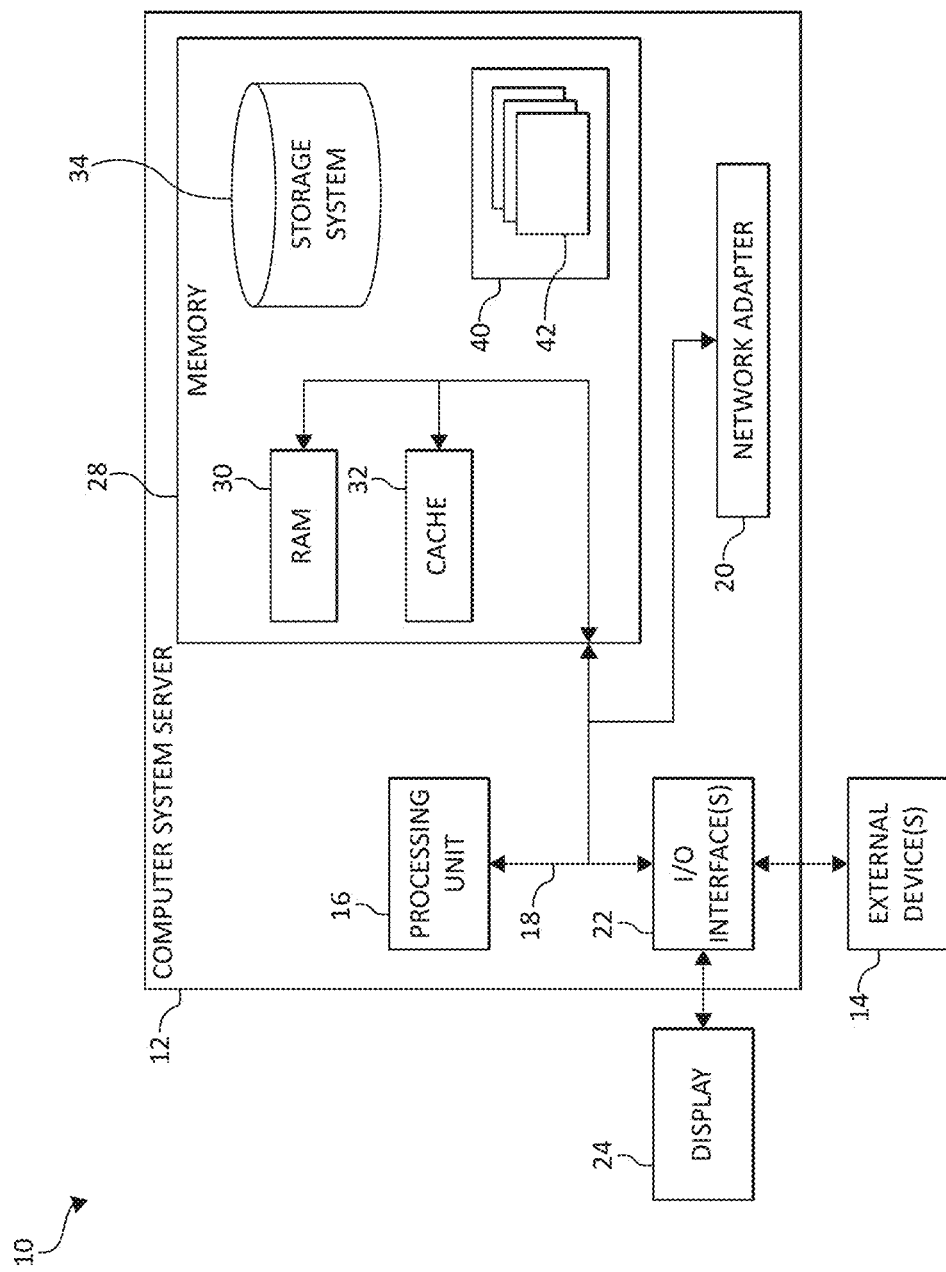
FIG. 1 is a block diagram depicting an exemplary cloud computing node according to an embodiment of the present invention.

A computing environment may include main storage (a.k.a., main memory), as well as secondary storage. Main storage is considered fast access storage compared to secondary storage such as, for example, storage class memory. Further, the addressing of main storage is considered simpler than the addressing storage class memory. Storage class memory, which is an external storage space outside of classical main storage, provides faster access than direct access storage devices. A storage class memory may be implemented as groups of solid state devices connected to a computing system via several input/output (I/O) adapters, which are used to map technology of an I/O device to the memory bus of the central processing unit(s).

Additionally, memory devices are used in a wide variety of applications, including computer systems. Computer systems and other electronic devices containing a microprocessor or similar device typically include system memory, which is generally implemented using dynamic random access memory (DRAM). Thus, it is desirable to use DRAM as a cache of second type memory. The second type memory may be slower, higher capacity, and/or inexpensive DRAM. The second type memory may also be some other type of memory such as, for example, non-volatile memory ("NVM") Flash, phase change material ("PCM"), and other emerging memory. In one aspect, emerging memory has high capacity, but typically slower (latency, bandwidth) than DRAM. Accordingly, the present invention uses DRAM as a cache to mitigate the lower performance of second ("$2^{nd}$") type memory. Thus, the present invention uses DRAM as a cache of a second type memory solves a challenge/problem where caches need directories (e.g., tag arrays) but the current state of the art directory sizes limit cache sizes because of the directory challenge.

The use of the DRAM as a cache of a second type memory has an additional challenge/problem where adding a directory requires significant resource consumption, design, and engineering work while impacting both the processor and memory design and schedules. Thus, use of the present invention eliminates this second challenge/problem since the present invention eliminates the need for additional bits in dram for a directory. Spare bits such as, for example, those in Double Data Rate 5 Synchronous ("DD5") DRAM are in high demand and therefore usually reserved for other purposes, and the present invention eliminates the need for these spare bits. Also, according to the present invention there is no need to change the processor "nest"—the nest is all the logic between cores and memory.

Accordingly, the present invention provides a DRAM cache as second type memory in a computing system. A selected amount of bytes of memory in a memory line may be cleared using one or more spare bits of the DRAM, a data compression operation, or a combination thereof. A cache directory and data may be stored in the memory line. The DRAM cache is configured as a cache of a second type memory.

In one aspect, the present invention may free up at least 4 bytes of space in a 128 byte memory line with a data compression operation. In another embodiment, if spare bits are available in DRAM such as, for example, in a DDR5 DRAM, data compression may be unnecessary. A cache directory and the data may be placed in the same memory line.

Additionally, the entire DRAM and/or a selected amount of the DRAM may become a cache of the SCM/slow DRAM with the average bandwidth/latency similar to that of DRAM and the capacity will be similar to that of SCM/slow DRAM. The current state of the art computer system caches' use a concept called "N-way" set-associativity where each memory line may be flexibly present in one of N positions in the cache, where N is a positive integer (e.g., 1, 2, 3, etc.). A larger N means larger flexibility in finding a position for the line in the cache. As such, highly associative caches have more flexibility in finding positions for memory lines but are more complex to implement. A direct mapped cache means that a memory line can be only in one position in the cache and therefore less flexible in finding a position in the cache for the memory line but is easier to implement.

In one aspect, the present invention, either a direct mapped (1-way) DRAM cache, or, due to compression, a 2-way set associative cache may be implemented with each line containing 1 or 2 cache lines depending on data compressibility. The present invention uses 128-byte size cache lines, same as the state of the art processor caches. Cache lines between the cache and the main memory is exchanged at the same cache line granularity of 128 bytes. In one aspect of the present invention, computing systems software support for implementing a cache is unnecessary since the present invention is an all hardware solution. Thus, the present invention provides advantage over the current state of the art solutions that 1) use page-based approaches, which require significant software development, 2) have performance penalty because the computing system must move an entire page of data (64 KB) between DRAM and SCM/slow DRAM even when single byte needs to be accessed in the page. In contrast, the present invention moves only 128 bytes therefore reduces memory bus bandwidth consumption. Due to the hardware solution, the DRAM cache is transparent to any software such as, for example, hypervisors, operating systems with no dependency to any software community.

In an additional aspect, the present invention provides a DRAM configurable as a cache of the SCM (storage class memory; the 2nd type memory assuming the system DRAM and 2nd type memory are sitting on separate memory channels (e.g., Open Coherent Accelerator Processor interface "OCAPI") and/or memory buffer attaching to both the DRAM and SCM). In one aspect, the DRAM cache of SCM may perform with similar cost and capacity of 2nd type memory (e.g., 4 terabyte "TB" DRAM cache backed with 32 TB SCM (with latency and bandwidth closer to 32 TB DRAM on average)).

The present invention requires no changes to the DRAM or SCM organizations such as, for example, 1) compatible with any DRAM design based on DDR4, DDR5, HBM, and any SCM, 2) additional bits being unnecessary for the cache directory (e.g., eliminating SRAM arrays, TLB, etc.), 3) no impact or dependence on a virtual memory subsystem, page tables, page sizes, 4) the unit of transfer and cache granularity is equal to 128 bytes which may be equal to the unit of memory transfer and L3 line size, 5) agnostic of where the implemented processor or the memory buffer chip of the DRAM cache (with trivial area impact), 6) transparent to the existing ECC, and/or 6) operates below a coherency domains such as, for example, the DRAM and SCM appears similar to a conventional DRAM.

The DRAM cache may add 1 and/or 2 processor cycles to a DRAM (e.g., the conventional/regular DRAM) read time when the cache is a "hit", which means that the memory line is present in the cache. When the memory line is not in the DRAM cache, there is a "miss" and the latency to access the memory line is that of the SCM latency. SCM latency depends on the memory technology used and may be 3 to 5 microseconds ("us") with SLC flash technology, and/or OpenCAPI type memory device technology, or 1-3 microseconds when SCM is NAND flash, and may be 1 microsecond when SCM is PCM. The SCM latency may be equal to twice ("2×") of a conventional/regular DRAM when SCM is slow DRAM technology.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
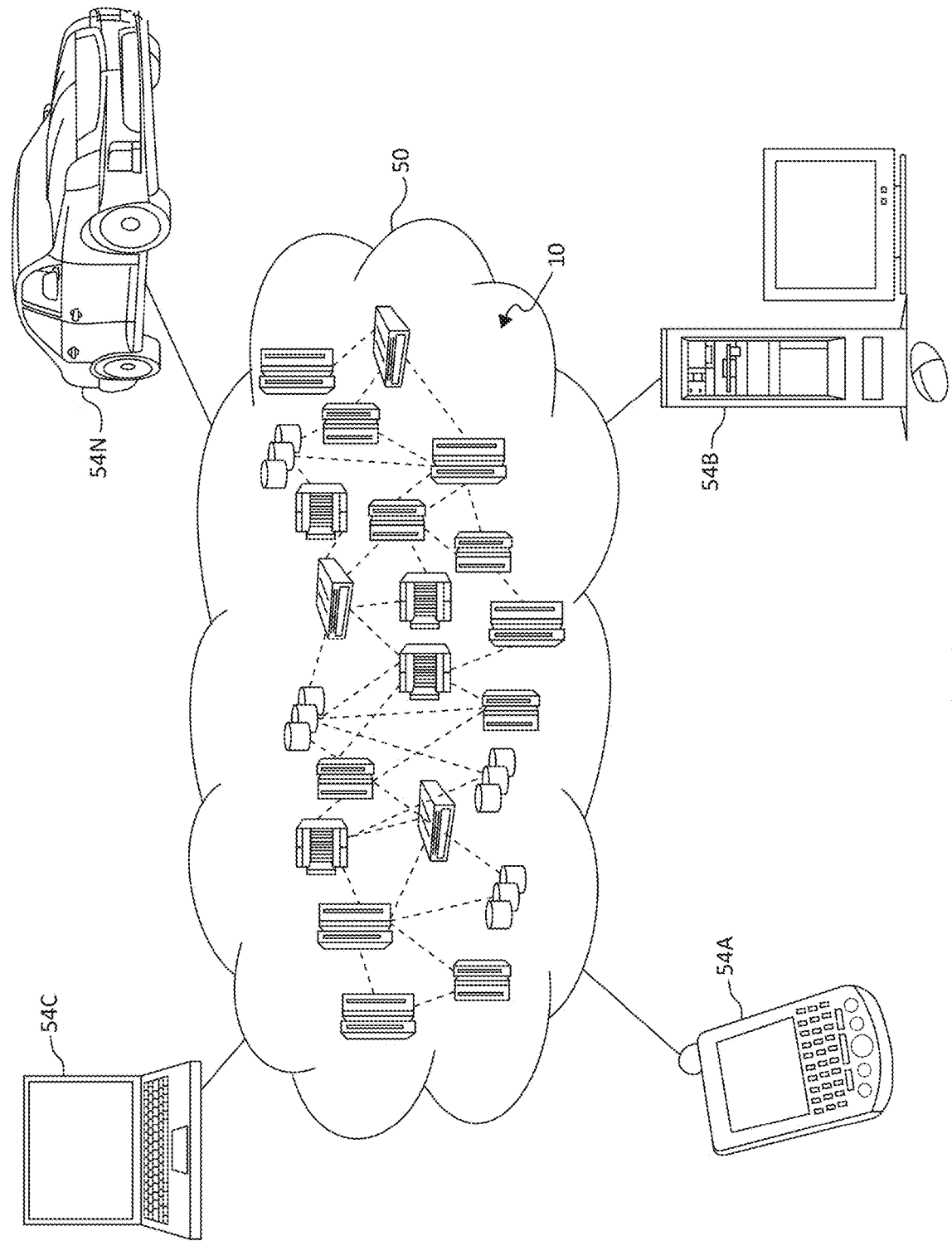
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
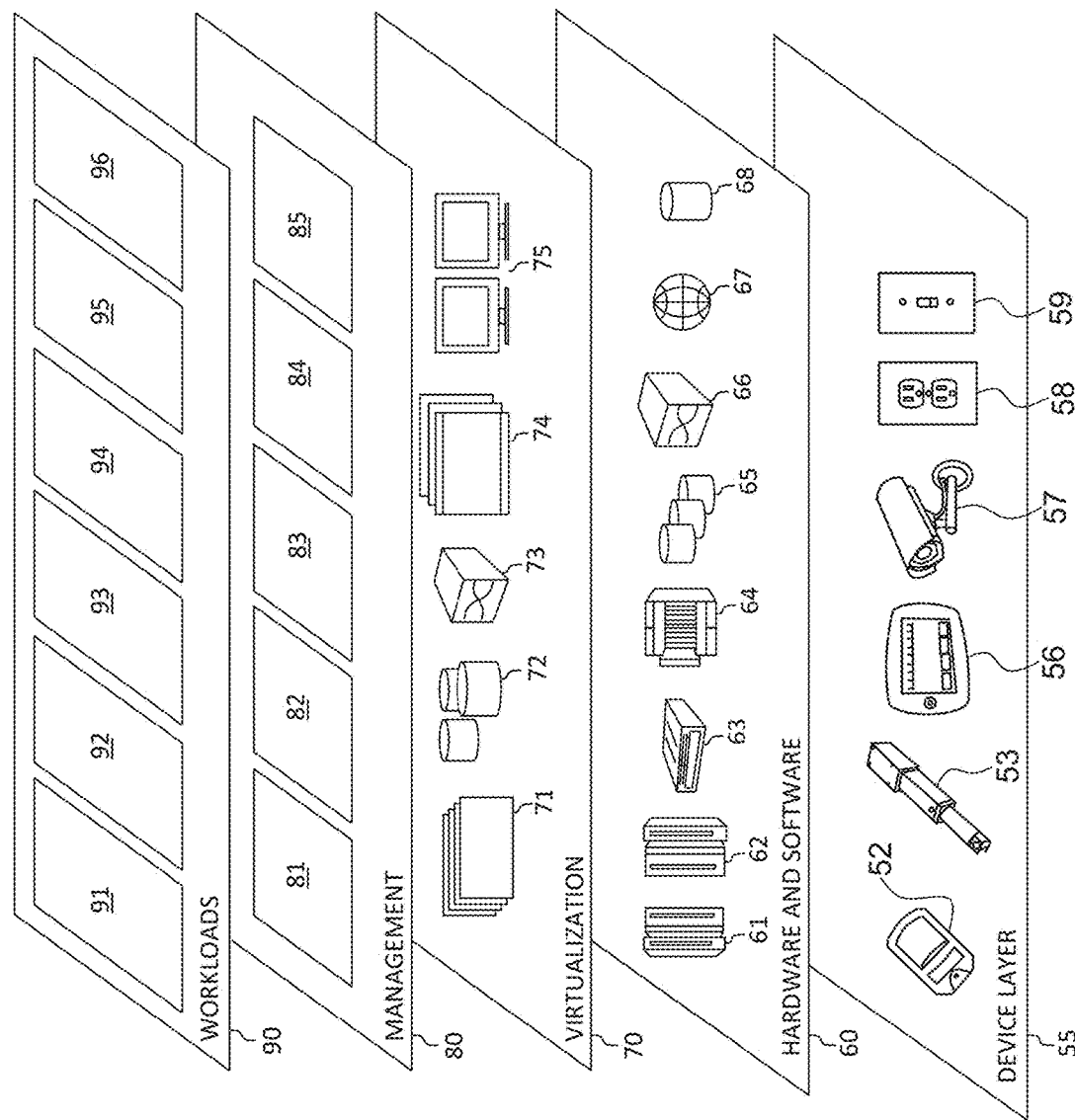
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing a dynamic random-access memory ("DRAM") cache in a computing environment. In addition, workloads and functions 96 for providing a dynamic random-access memory ("DRAM") cache in a computing environment may include such operations as data analysis (including data collection and processing from various environmental sensors) and/or analytics operations. One of ordinary skill in the art will appreciate that the workloads and functions 96 for providing a dynamic random-access memory ("DRAM") cache in a computing environment may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously indicted, the present invention provides a novel solution for providing a DRAM as a cache as second type memory. In operation, an existing DRAM may be accessed and utilized. An SCM or slow DRAM may be OCAPI or Memory Bus attached. The SCM/slow DRAM size may be an integer multiple of the DRAM size (e.g., a minimum of 2 times the size such as, for example, a 1 terabyte ("TB") DRAM and 16 TB SCM/Slow DRAM. The unit of storage in this DRAM cache is a 128-byte size block of data, referred to as a 'line' in the following.

Upper SCM address bits may become a tag in the cache (e.g., the address tag size bits may be equal to log 2(size of SCM/size of DRAM), equal to 4 bits, and/or may be equal to a maximum of 8 bit tags for any future expansion (e.g., a SCM to DRAM capacity ratio of 256).

Additionally, a 128 byte memory line may be compressed where each memory line may be compressed to 124 bytes or less (e.g., using a small and fast compressor). In one aspect, all or portions of the memory lines will compress to a selected/desired result (e.g., 124/128=97%) of the original size. Once the memory line is compressed, it's respective address tag may be stored in the 4 byte space in the cache line freed up due to compression (e.g., the tag size is maximum 8 bits previously indicated). The compressed cache line also contains Valid and Modified bits (2 bits) and/or compressed and cached ID (CID) field (e.g., 20 or 21 bits long). The CID field in the cache line indicates when the memory line is stored in the DRAM cache in compressed form. CID is a predetermined bit pattern that the memory controller recognizes in identifying whether the cached line is compressed or not. When the memory line cannot be compressed, the CID bit pattern is not present. Therefore, in one aspect of the present invention, uncompressed memory lines are stored in the SCM and not stored in the DRAM cache.

If a memory line compresses to 60 bytes or less, two compressed memory lines may be stored in one 128-byte size cache line (e.g., a 2-way set associative DRAM cache). In that case, each compressed line comprises 4 bytes of control information (tag, CID, valid, modified) plus 60-byte of compressed data therefore 64 bytes in total. Accordingly, the two compressed memory lines may be stored in the place of one 128-byte cache line. A control bit may be added in the freed-up space to indicate whether the cache line is a 1-way or 2-way set associative DRAM cache (e.g., the fast/small memory 520 (e.g., fast/small 1st type of memory).

It should be noted that the CID may be a 20 bit arbitrary constant set at power up time such as, for example CID=0xEDB3A. The selected CID value is written to the SystemCID register and from then on the value is used to recognize compressed cache lines.

When a CID value stored in the cached line equals the systemCID register, it indicates that the 128 byte line is in the compressed format, and therefore the memory line contains control information such as, for example, a cache tag, valid, and/or modified bits.

When a CID value stored in the cache line does not equal the systemCID register, it indicates that the 128 byte line contains raw data, in an uncompressed form. The system CID register value never changes, but may have a logical operation performed on it (e.g., it can be XOR'ed) with a hash of the memory address when stored in the cache line.

In other aspect, the systemCID register content may be updated periodically, but the cached lines in the DRAM must be updated accordingly.

For a read hit, the following operations may be performed. The memory line may be requested from the DRAM serving as cache of second type memory, for example SCM. The CID field in the cache line may be compared against the SystemCID register. If the two values are equal, it indicates that the line is compressed. The line's valid bit is checked. If the line is valid, the address requested by the processor is compared to the address tag stored in the cache line. If the requested line is found in the DRAM cache (e.g., a cache read hit), the data may be decompressed and delivered to the processor.

For a read miss, the following operations may be performed. The CID field in the cache line may be compared against the SystemCID register. If the two values match the line is compressed. The valid bit is checked. If the line is valid, the address requested by the processor is compared to the address tag stored in the cache line. If the requested address does not match the stored tag, then the line is not found in the DRAM cache (e.g., a cache miss). Subsequent to the miss, the 128-byte missed memory line is fetched/retrieved from the SCM and delivered to the processor. If the 128-byte memory line delivered to the processor compresses to 124 bytes or less, the old line in the DRAM cache may be replaced and written back to the SCM if necessary. A new address tag and control fields may be written in the DRAM cache line (e.g., the newly written memory line in the DRAM cache). The CID field may be written to indicate that the memory line is cached and compressed. If the 128-byte memory block does not compress, the existing DRAM cache line is not replaced.

For a write hit, the following operations may be performed. The memory line may be first read from the DRAM cache. The CID field of the line may be compared to the SystemCID register. The stored address tag may be compared to the address requested by the processor. Assuming the requested memory line is located/found in the DRAM, the written line may be compressed. If the memory line is 124 byte or less, the existing memory line (no need to write-back) may be overwritten. If memory line does not compress, the DRAM line may be set as invalid and the memory line may be written to the SCM. Optionally, the implied line may be brought from the SCM in to the DRAM.

For a write miss, the following operations may be performed. The memory line may be first read from the DRAM cache. The CID field of the line may be compared to the SystemCID register. The address tag may be compared. Assuming the requested memory line is not located/found in the DRAM, the written block may be compressed. If 124 byte or less, the existing line may be replaced (and the old line written back to SCM, if the Modified bit was valid). If the memory line does not compress, the memory line may be written to the SCM and the old memory line is not replaced.

Figure 4A:
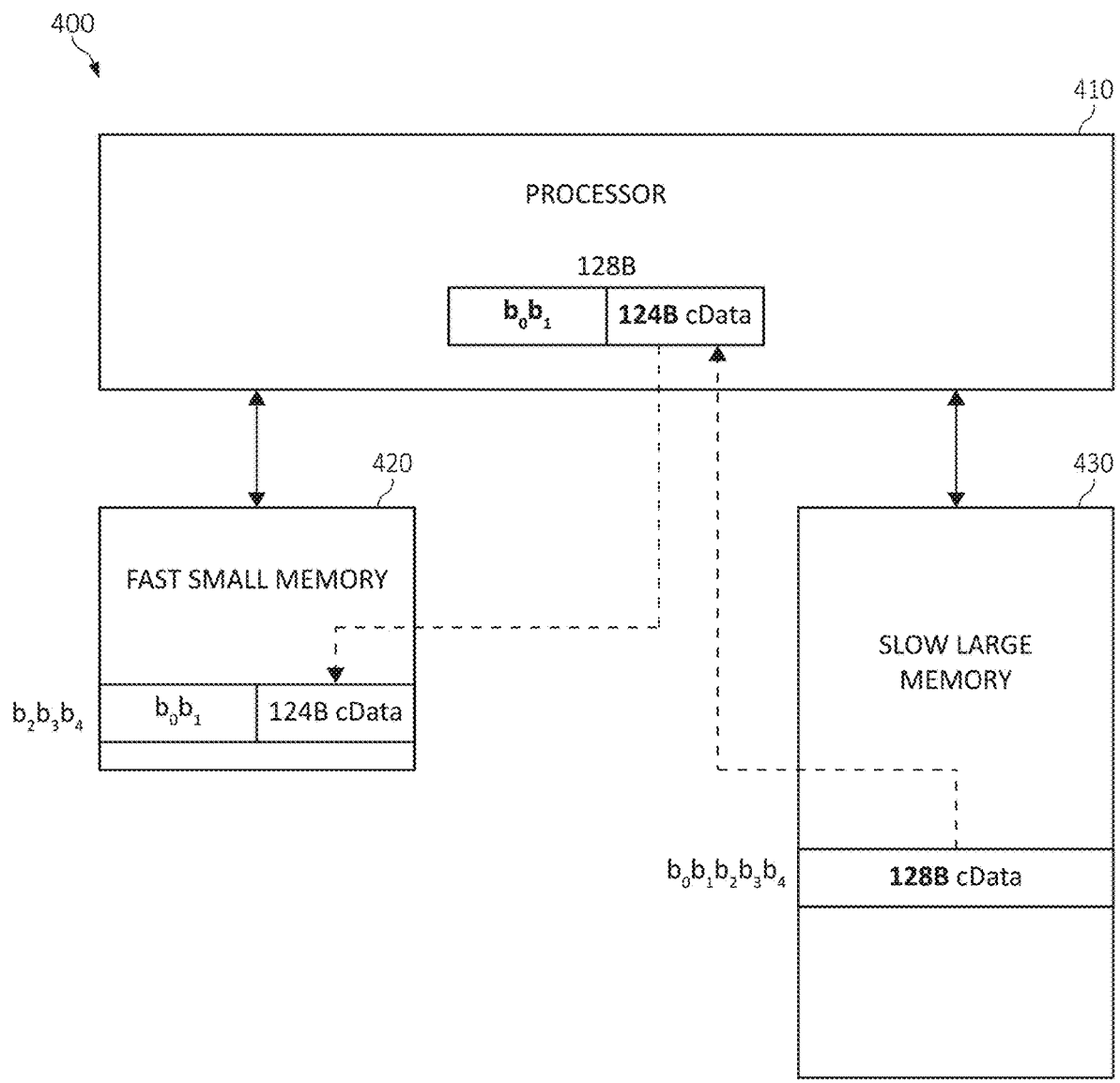
FIG. 4A-4C is an additional block diagram depicting operations of a base system for dynamic random-access memory ("DRAM") cache as second type memory in which aspects of the present invention may be realized.
Figure 4B:
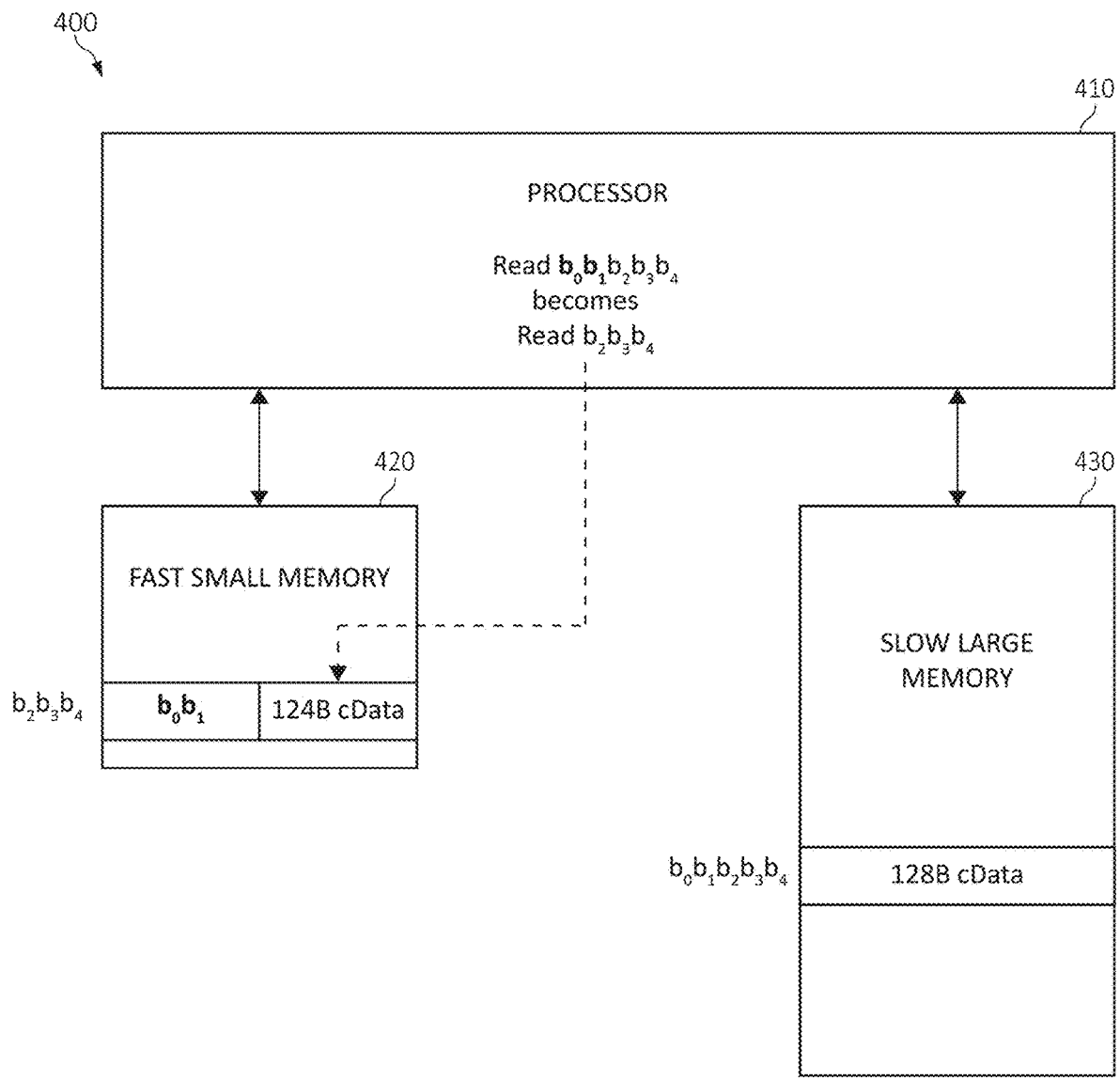
Figure 4C:
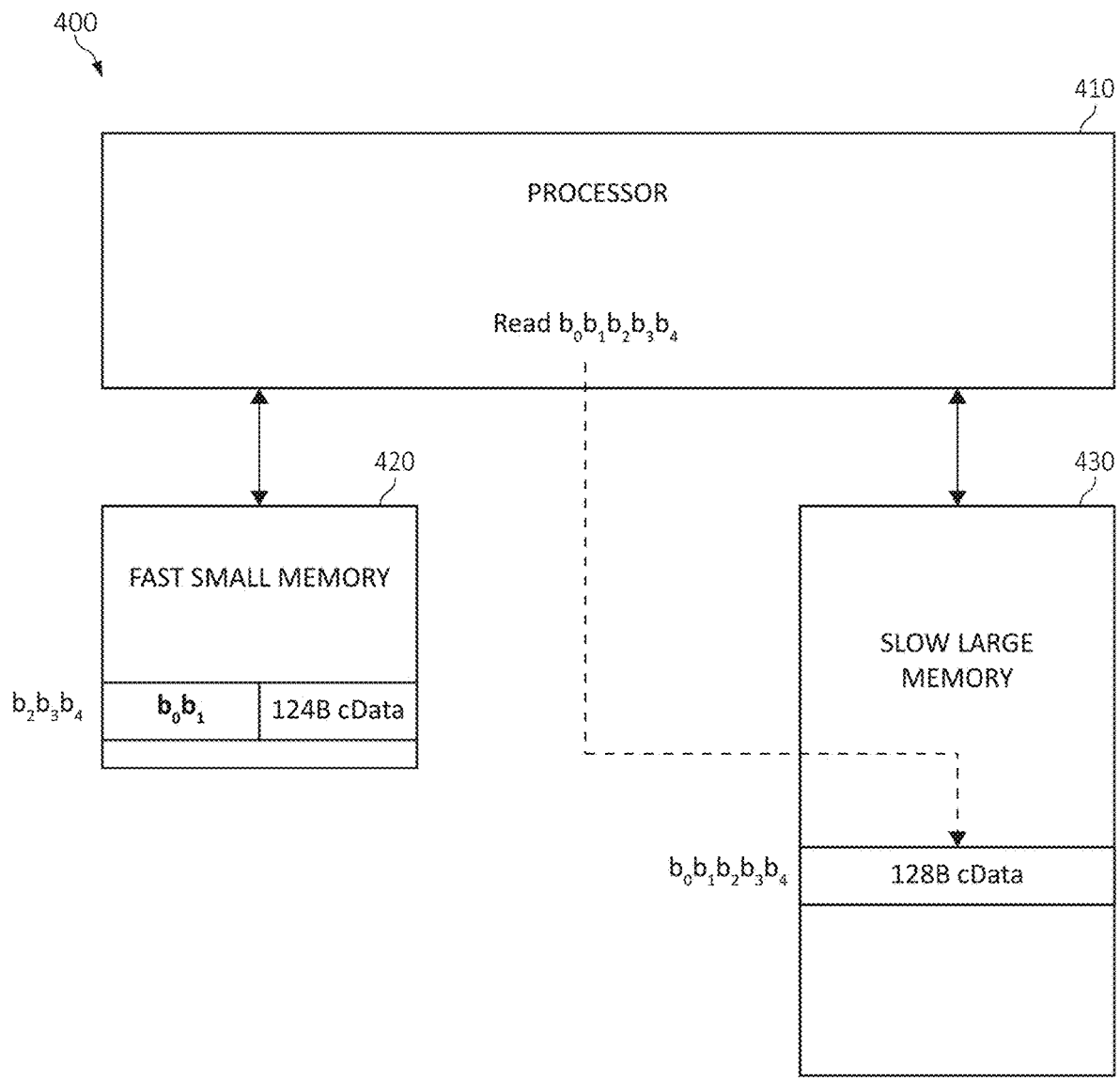

FIGS. 4A-4C depict operations of a base system 400 for dynamic random-access memory ("DRAM") cache as second type memory. That is, block diagrams of base system 400 depicts a processor 410, a fast/small memory 420 (e.g., fast/small $1^{st}$ type of memory, for example, the DRAM cache) and a slow/large memory 430 (e.g., slow/large $2^{nd}$ type memory, for example the SCM). That is, the fast/small memory 420 is functioning as a DRAM cache of the slow/large memory 430 (e.g., slow/large $2^{nd}$ type memory). In one aspect, one or more of the components, modules, services, applications, and/or functions described in FIGS. 1-3 may be used in FIGS. 4A-4C.

Turning now to FIG. 4A, in a first step, the operations of the base system 400 uses the DRAM cache to store the 128 byte slow memory line (@address $b_0$, $b_1$, $b_2$, $b_3$, $b_4$) by reading the 128 byte slow memory line (@address $b_0$, $b_1$, $b_2$, $b_3$, $b_4$). In a second step, the 128 byte slow memory line (@address $b_0$, $b_1$, $b_2$, $b_3$, $b_4$) may be compressed to 124 bytes (or less) on the processor 410, freeing up 4 bytes.

In a third step, the upper address bits $b_0$, $b_1$ called "tag" is written in to the 4 byte free space. At this point, the tag (e.g., upper address bits $b_0$, $b_1$) and data is stored in the same 128-byte line. In the fourth step, the 128-byte line (from the processor 410) may be written to the memory line (@address $b_2$, $b_3$, $b_4$ of the fast/small memory 420. It should be noted that there were no required changes in the memory organization nor required additional bits or computer components (e.g., hardware wires).

Turning now to FIG. 4B, when the processor 410 needs to read from the memory line (@address $b_0$, $b_1$, $b_2$, $b_3$, $b_4$), in a first action step, the top/upper address bits $b_0$, $b_1$ may be stripped out from the memory line @address $b_0$, $b_1$, $b_2$, $b_3$, $b_4$ and then processor requests to read from to the memory line @address $b_2$, $b_3$, $b_4$ of the fast/small memory 420. In a second action step, if the tag (e.g., upper address bits $b_0$, $b_1$) that is read from the memory line @address $b_2$, $b_3$, $b_4$ of the fast/small memory 420 equals the requested address, then there is a Cache hit. The 124B or smaller cData (e.g., cache data) may be decompressed and delivered to the processor 410 (e.g., processor cores). Alternatively, in a third action step, if the tag (e.g., upper address bits $b_0$, $b_1$) that is read from the memory line @address $b_2$, $b_3$, $b_4$ of the fast/small memory 420 does not match the requested address, then there is a cache miss.

Continuing from third action step of a cache miss in FIG. 4B (e.g., if the tag (e.g., upper address bits $b_0$, $b_1$) that is read from the memory line @address $b_2$, $b_3$, $b_4$ of the fast/small memory 420 does not match the requested address, then there is a Cache miss) in a fourth action step as illustrated in FIG. 4C, the missed address of the memory line @address $b_0$, $b_1$, $b_2$, $b_3$, $b_4$ must be sent to the slow/large memory 430 (e.g., slow/large $2^{nd}$ type memory).

Figure 5A:
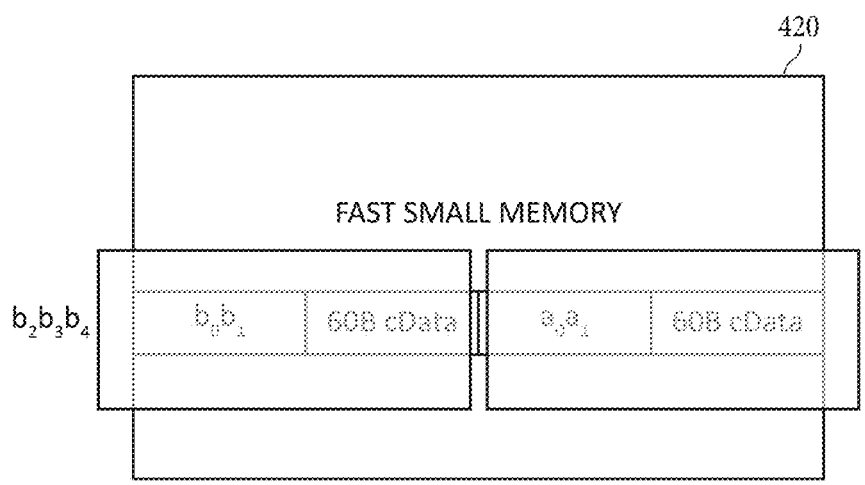
FIG. 5A-5B are block diagrams depicting a DRAM cache a one-to-two ("1 to 2") and one to four ("1 to 4") way set associative cache in accordance with aspects of the present invention.
Figure 5B:
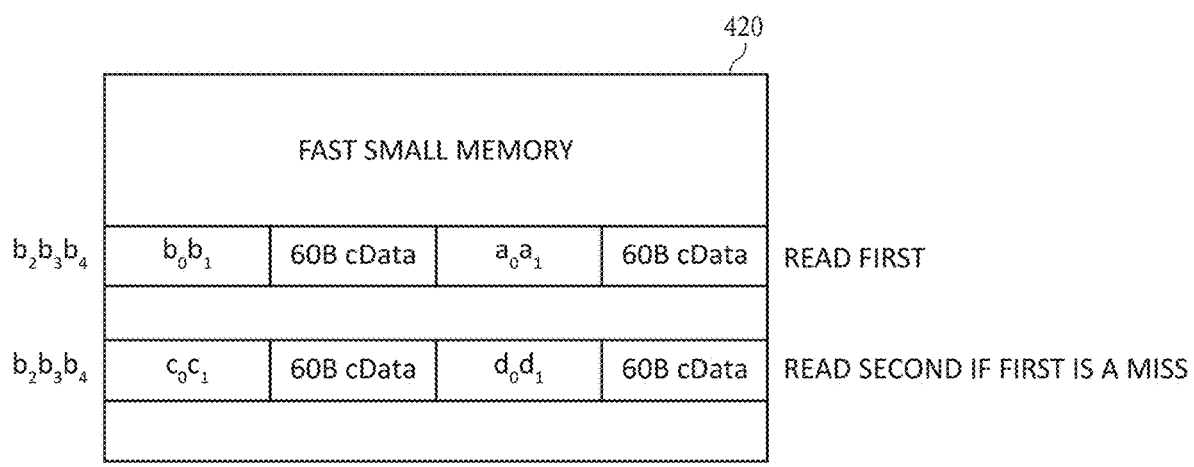

Turning now to FIGS. 5A-5B, diagrams FIG. 5A depicts a one-to-two ("1 to 2") way set DRAM cache 500 and one to four ("1 to 4") way set associative DRAM cache (e.g., the fast/small memory 520 (e.g., fast/small $1^{st}$ type of memory) of FIG. 4A-4C). In one aspect, one or more of the components, modules, services, applications, and/or functions described in FIGS. 1-4A-4C may be used in FIGS. 5A-5B. Repetitive description of like elements, components, modules, services, applications, and/or functions employed in other embodiments described herein is omitted for sake of brevity.

As depicted in FIG. 5A, if the 128-byte line compresses to less than 60 bytes each then two memory lines may be placed/stored in the space of one memory line of the fast/small memory 420 (e.g., fast/small $1^{st}$ type of memory). That is, if the compressed totals of the two memory lines are 120B or less, they can be put in the same memory line. In other words, the two memory lines at memory line @address $b_0$, $b_1$, $b_2$, $b_3$, $b_4$ and memory line @address $a_0$, $a_1$, $b_2$, $b_3$, $b_4$ in the same physical memory line @address $b_2$, $b_3$, $b_4$. Thus, the 2-way associativity cache is desirable because it typically increases the cache hit rate.

Turning now to FIG. 5B, an alternate "second chance" location may be dynamically chosen for each memory line further adding (e.g., doubling) associativity from 2-way associativity cache to a 4-way associativity cache. If the first location (e.g., first memory line) is a cache miss, the second location (e.g., a second memory line) may be searched. The second location implies two reads (e.g., read the first location then read the second location), which will increase the read delay (avg. 1.5 microseconds). However, if the cache miss penalty is high, searching the second location in the fast/small memory 420 (e.g., fast/small $1^{st}$ type of memory) may be preferable because increased associativity reduces misses to the slow/large memory 430 (e.g., slow/large $2^{nd}$ type memory) of FIG. 4A-4C.

It should be noted that the fast/small memory 420 may be referred to as a 1 to 4-way associativity cache since, in a worst case scenario, the two lines will not compress to 60B each and each location will store one line (e.g., 2-way). In the best case scenario, both locations (e.g., first location and second location of the fast/small memory 420) may store 2 lines. In an average scenario (e.g., middle), one location may have 2 lines and the other location may have 1 line (3-way).

Figure 6:
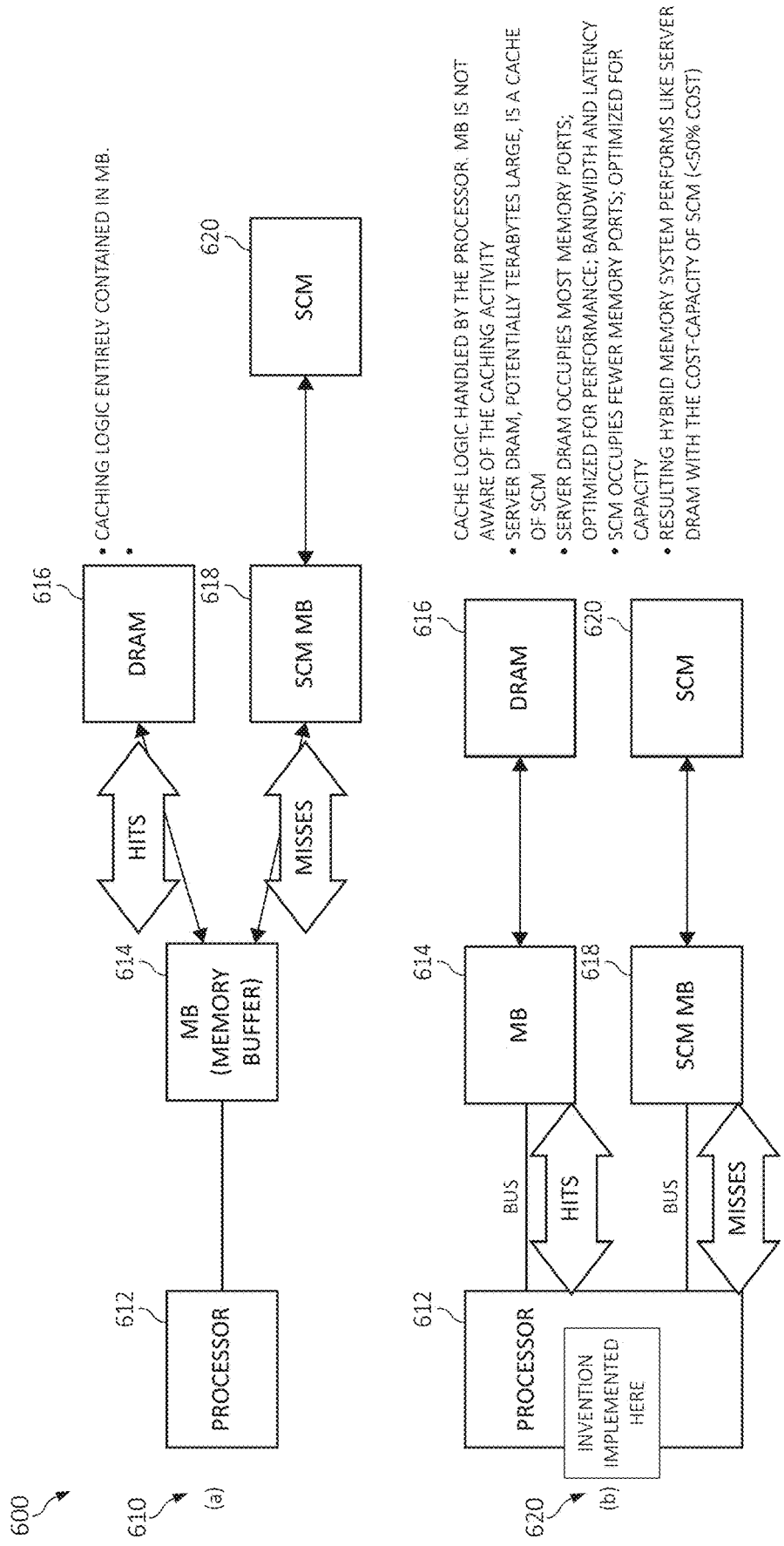
FIG. 6 is an additional block diagram depicting operations of various options for dynamic random-access memory ("DRAM") cache as second type memory in which aspects of the present invention may be realized.

FIG. 6 is an additional block diagram depicting operations of various options for dynamic random-access memory ("DRAM") cache as second type memory in which aspects of the present invention may be realized. In one aspect, one or more of the components, modules, services, applications, and/or functions described in FIGS. 1-5A-5B may be used in FIG. 6. Repetitive description of like elements, components, modules, services, applications, and/or functions employed in other embodiments described herein is omitted for sake of brevity.

As depicted in system 610, the system 610 may include a processor connected to a memory buffer ("MB") via a bus. A Dram and a SCM MB may each be associated with the MB. The SCM MB may be associated with an SCM. In such configuration, caching logic may be entirely contained in the MB. Dram capacity may be a substantial fraction of the SCM to increase cache hit rates.

As depicted in system 620, the system 640 may include a processor connected to a memory buffer ("MB") via a first bus and connected to an SCM MB via a second bus. A Dram may be associated with the MB. The SCM may be associated with the MB.

In such configuration, caching logic may be entirely handled by the processor with the memory buffers and memory controllers being completely unaware of the caching activity. The DRAM (e.g., a server DRAM) may be the Dram Cache of the SCM, which may have a selected amount of storage capacity (e.g., up to several terabytes in size). The DRAM (e.g., a server DRAM) may occupy a selected number of memory ports (e.g., a majority of memory ports) and optimized for performance (e.g., optimized bandwidth and minimized latency).

The SCM may also occupy fewer memory ports and optimized for storage capacity. As a result, a hybrid memory system performs similar to a server DRAM with cost-capacity of the SCM (e.g., less than 50% cost of an all DRAM system).

Turning now to FIG. 7, table 700 depicts a first order performance estimation. In one aspect, one or more of the components, modules, services, applications, and/or functions described in FIGS. 1-6 may be used in FIG. 7. Repetitive description of like elements, components, modules, services, applications, and/or functions employed in other embodiments described herein is omitted for sake of brevity.

As depicted, table 700 depicts a first order performance estimation for a baseline system (DRAM only), a slow DRAM, a DRAM cache and slow DRAM (e.g., 90% cache hit rate on DRAM cache), an SCM, and a DRAM cache and SCM (e.g., 90% cache hit rate on the DRAM cache). The first order performance estimation includes an average latency relative to DRAM, a relative CPI, and details. Cycles Per Instruction (CPI) is a figure of merit describing processor performance. The lower the CPI indicates a higher the performance. Simulation results show that memory latency is responsible for 20% of the CPI (e.g., 10-30% is average depending on the processor workload). As depicted, table 700 column 710 illustrates how Average CPI is calculated. For example, Slow DRAM has 2.0 times the latency of DRAM. Since Slow DRAM is responsible for 20% of the CPI and it has 2 times the latency of DRAM, Average CPI is 1.2 as calculated in the second row of 710. Whereas, if Slow SRAM is to be combined with a DRAM cache, the average latency would be 1.2, a reduction from 2.0 of the Slow DRAM only solution, and accordingly the calculation of $3^{rd}$ row in 710 shows that the DRAM cache and Slow DRAM solution (e.g., DRAM cache+Slow DRAM solution) has an Average CPI of 1.04 which is smaller than 1.2 of the same for Slow DRAM only solution.

Figure 8:
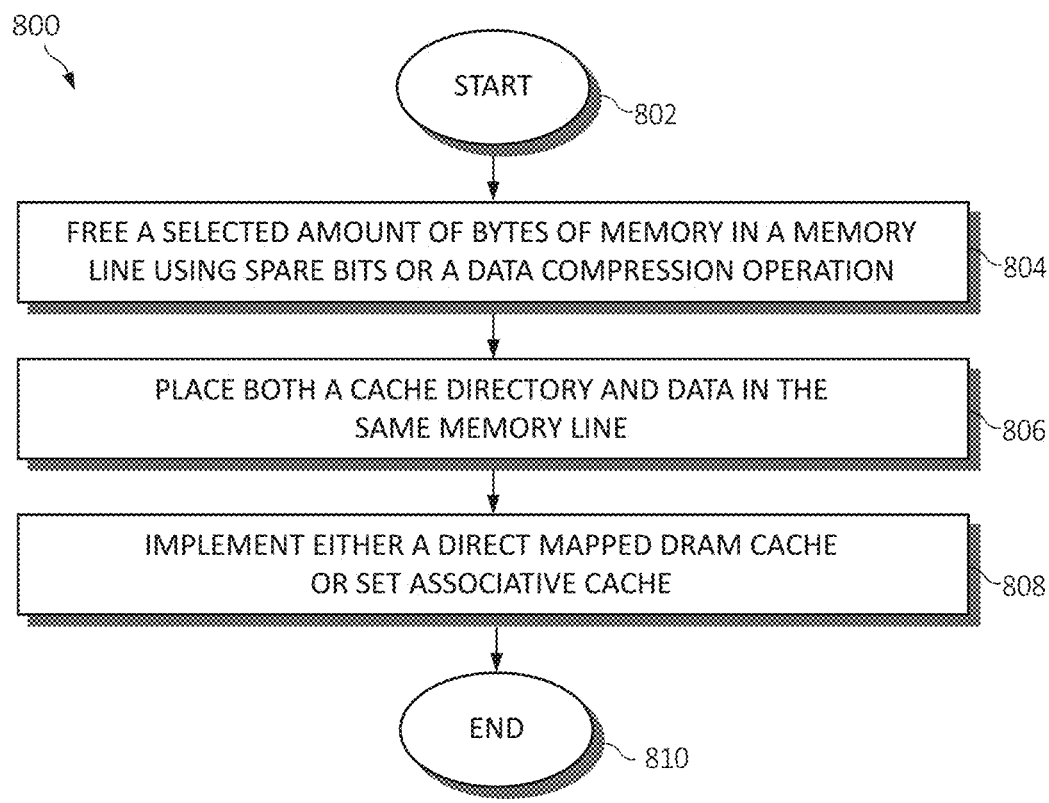
FIG. 8 is a flowchart diagram depicting an exemplary method for providing a dynamic random-access memory ("DRAM") cache as second type memory in a computing system in which aspects of the present invention may be realized.

Turning now to FIG. 8, a method 800 for providing a dynamic random-access memory ("DRAM") cache as second type memory in a computing environment is depicted, in which various aspects of the illustrated embodiments may be implemented. The functionality 800 may be implemented as a method executed as instructions on a machine, where the instructions are included on at least one computer readable medium or on a non-transitory machine-readable storage medium. The functionality 800 may start in block 802.

A selected amount of bytes of memory in a memory line may be freed (e.g., cleared, replaced, and/or edited) using one or more spare bits of the DRAM, a data compression operation, or a combination thereof, as in block 804. A cache directory and data may be placed (and stored) in the memory line (e.g., placed in the same memory line), as in block 806. The DRAM cache is implemented/configured as a cache of a second type memory (e.g., a direct mapped DRAM cache or one-to-many way set associative cache), as in block 808. The functionality 800 may end in block 810.

In one aspect, in conjunction with and/or as part of at least one block of FIG. 8, the operation of method 800 may include each of the following. The operation of functionality 800 may configure the DRAM cache as the cache of a storage class memory ("SCM") or a Slow DRAM solution, and/or configure the DRAM cache as a direct mapped DRAM cache or a set associative cache.

The operation of functionality 800 may configure the DRAM cache as a one or two way set associative cache where two memory lines are placed in the same location, and/or configure the DRAM cache as a one-to-four way set associative cache where two memory lines are placed in a first same location and two alternative memory lines are placed in a second same location.

The operation of functionality 800 may compress data in the selected amount of bytes in the memory line to place both the cache directory and data. The operation of functionality 800 may add a tag and metadata in a data section that is freed in the memory line.

The operation of functionality 800 may compress the memory line equal to or less than 124 bytes and freeing up to at least four bytes, store a tag and data in the memory line, and/or write the memory line to a first type memory and a second type memory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for providing a dynamic random-access memory ("DRAM") cache as second type memory in a computing environment, comprising:
   clearing a selected amount of bytes in a memory line using one or more spare bits of the DRAM and a data compression operation, wherein the data compression operation compresses the memory line equal to or less than 124 bytes and frees up to at least four bytes; and
   storing both a cache directory and data in the memory line, wherein the memory line is written to a first type memory and a second type memory and the DRAM cache is configured as a cache of the second type memory.

2. The method of claim 1, further including configuring the DRAM cache as the cache of a storage class memory ("SCM") or a slow DRAM solution.

3. The method of claim 1, further including configuring the DRAM cache as a direct mapped cache or a set-associative cache.

4. The method of claim 1, further including:
   configuring the DRAM cache as a one-to-two way set associative cache where two memory lines are placed in a similar location; or
   configuring the DRAM cache as a one-to-four way set associative cache where two memory lines are placed in a first similar location and two alternative memory lines are placed in a second similar location.

5. The method of claim 1, further including compressing data in the selected amount of bytes in the memory line to place both the cache directory and data.

6. The method of claim 1, further including adding a tag and metadata in a data section that is cleared in the memory line.

7. A system for providing a dynamic random-access memory ("DRAM") cache as second type memory in a computing environment, comprising:
   one or more computers with executable instructions that when executed cause the system to:
   clear a selected amount of bytes in a memory line using one or more spare bits of the DRAM and a data compression operation, wherein the data compression operation compresses the memory line equal to or less than 124 bytes and frees up to at least four bytes; and
   store both a cache directory and data in the memory line, wherein the memory line is written to a first type memory and a second type memory and the DRAM cache is configured as a cache of the second type memory.

8. The system of claim 7, wherein the executable instructions configure the DRAM cache as the cache of a storage class memory ("SCM") or a slow DRAM solution.

9. The system of claim 7, wherein the executable instructions configure the DRAM cache as a direct mapped DRAM cache or a set associative cache.

10. The system of claim 7, wherein the executable instructions:
    configure the DRAM cache as a one-to-two way set associative cache where two memory lines are placed in a similar location; or
    configure the DRAM cache as a one-to-four way set associative cache where two memory lines are placed in a first similar location and two alternative memory lines are placed in a second similar location.

11. The system of claim 7, wherein the executable instructions compress data in the selected amount of bytes in the memory line to place both the cache directory and data.

12. The system of claim 7, wherein the executable instructions add a tag and metadata in a data section that is cleared in the memory line.

13. A computer program product for providing a dynamic random-access memory ("DRAM") cache as second type memory in a computing environment by a processor, the computer program product comprising a non-transitory computer-readable storage medium having computer-readable program code portions stored therein, the computer-readable program code portions comprising:

an executable portion that clears a selected amount of bytes in a memory line using one or more spare bits of the DRAM and a data compression operation, wherein the data compression operation compresses the memory line equal to or less than 124 bytes and frees up to at least four bytes; and an executable portion that stores both a cache directory and data in the memory line, wherein the memory line is written to a first type memory and a second type memory and the DRAM cache is configured as a cache of the second type memory.

14. The computer program product of claim 13, further including an executable portion that configures the DRAM cache as the cache of a storage class memory ("SCM") or a slow DRAM solution.

15. The computer program product of claim 13, further including an executable portion that configures the DRAM cache as a direct mapped DRAM cache or a set associative cache.

16. The computer program product of claim 13, further including an executable portion that:

configures the DRAM cache as a one-to-two way set associative cache where two memory lines are placed in a similar location;

configures the DRAM cache as a one-to-four way set associative cache where two memory lines are placed in a first similar location and two alternative memory lines are placed in a second similar location; or compresses data in the selected amount of bytes in the memory line to place both the cache directory and data.

17. The computer program product of claim 13, further including an executable portion that adds a tag and metadata in a data section that is cleared in the memory line.

* * * * *